United States Patent [19]

Strobach et al.

[11] 3,978,309

[45] Aug. 31, 1976

[54] SACRIFICIAL, SHAPED ANODE AND METHOD OF CONSTRUCTING SAME

[75] Inventors: Carl G. Strobach, Clarendon Hills; Paul G. Daugirda, Evergreen Park; William E. Fahey, Palos Heights, all of Ill.

[73] Assignee: Rheem Manufacturing Company, New York, N.Y.

[22] Filed: Jan. 8, 1975

[21] Appl. No.: 539,395

[52] U.S. Cl. ............................... 219/104; 204/196; 219/58; 219/106
[51] Int. Cl.² ..................... B23K 11/02; C23F 13/00
[58] Field of Search ............... 219/57, 58, 104, 106; 204/148, 196, 197

[56] References Cited
UNITED STATES PATENTS

| | | | |
|---|---|---|---|
| 434,468 | 8/1890 | Robb | 219/106 |
| 1,977,846 | 10/1934 | Febrey | 219/104 X |
| 2,447,085 | 8/1948 | Odlum | 219/104 X |
| 2,740,757 | 4/1956 | Craver | 204/197 |

Primary Examiner—J. V. Truhe
Assistant Examiner—N. D. Herkamp
Attorney, Agent, or Firm—Allegretti, Newitt, Witcoff & McAndrews

[57] ABSTRACT

A shaped, sacrificial anode for water tanks and a method of constructing the same from extruded sections is disclosed, particularly an anode having a greater mass adjacent to regions of the tank where improved corrosion protection is needed.

5 Claims, 5 Drawing Figures

SACRIFICIAL, SHAPED ANODE AND METHOD OF CONSTRUCTING SAME

BACKGROUND OF THE INVENTION

Conventional sacrificial anodes are employed in various metal structures, for example, hot water tanks, in order to prevent the corrosion of the tank. As the term indicates, the anode itself is depleted during its operational life to provide cathodic protection of the metal structure. Prior to this invention, these anodes were cylindrically-shaped rods of magnesium, zinc, or aluminum metal having a uniform diameter and containing a metal core of a strong conductive material, such as steel.

Applicants have found that in many applications, consumption of the anode is uneven and that the amount of corrosion protection varies in part as a function of the location of the anode. For example, tests have shown that approximately 90% of the anode activity occurs in the top and bottom third of a cylindrical, glass-lined, metallic hot water tank. On the other hand, only 10% of the anode activity occurs in the middle one-third of the tank.

The reason for non-linear consumption of the sacrificial anode is that larger amounts of cathode area requiring protection are located in the top and bottom areas of the tank. The non-linear consumption of the sacrificial anode therefore causes it to thin out more rapidly in the anode adjacent to the top and bottom sections of the tank. This requires replacement of the anode rod even though the central section of the rod remains usable. Failure to replace the anode will result in diminished anode protection, decreasing the effective life of the tank.

Accordingly, the present invention is related to a shaped anode formed from a plurality of extruded anode sections, and a method of forming the same.

SUMMARY OF THE INVENTION

The shaped anode of this invention is adapted for use in a metal structure designed to contain an electrically conductive fluid and is specifically directed toward an improved sacrificial anode for placement within the structure and immersible in the fluid. The shaped anode is adapted to cathodically protect the structure from corrosion and includes a first extruded anode rod section having a conductive inner core. The shaped anode also includes a second extruded anode rod section also having an inner conductive core. The second section is connected to one end of the first section. The second anode section is shaped so that the ratio of its mass to its length is greater than the ratio of the mass to the length of the first anode section. The improved anode of this invention is immersed in the fluid, with the second anode section located in a portion of the metal structure requiring relatively greater cathodic protection than the cathodic protection required in the portion of the structure in which the first anode section is located.

The present invention is also related to a method of forming an improved shaped anode from a plurality of extruded anode rod sections which generally includes the steps of taking a first extruded anode section having an inner metal core and a second extruded anode section having a mass to length ratio greater than the mass to length ratio of the first anode section, contacting the first and second anode sections, and then resistance-welding the first and second sections together so that these sections may be placed in the container to be protected, with the second anode section located in a portion of the container requiring greater cathodic protection than the portion of the container in which the first anode section is placed.

Accordingly, it is an object of the present invention to provide an improved shaped, extruded, sacrificial anode and a method of constructing the same.

It is a further object of the present invention to provide a sacrificial anode shaped in such a manner as to provide maximum mass area of the anode in locations of the container requiring maximum corrosion protection.

It is still another object of the present invention to provide a method of forming a shaped sacrificial anode from extruded anode sections in which the shaped anode is formed of two or more extruded anode sections, one of said sections having a greater ratio of mass to length than the the other in order to provide a greater amount of anode in areas where it is needed most.

These and other objects, advantages and features of the present invention will be more readily understood by reference to the specification which follows.

BRIEF DESCRIPTION OF THE DRAWINGS

There follows a brief description of the drawings showing a preferred embodiment of the present invention wherein like numerals refer to like elements and wherein.

DETAILED DESCRIPTION OF THE PREFERRED EMBODIMENT

Figure 1:
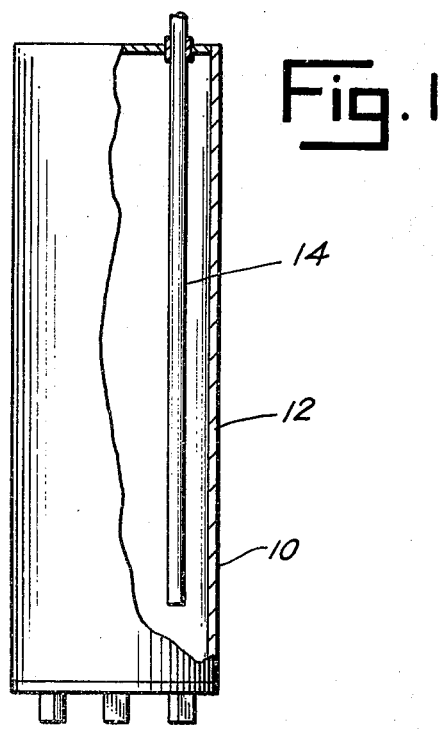
FIG. 1 is a side elevational view of a container and conventional anode of the prior art.
Figure 2:
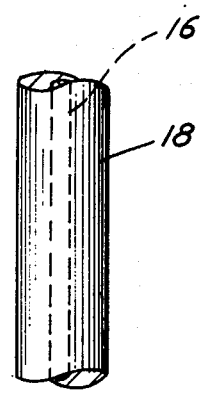
FIG. 2 is a side perspective view of the conventional anode shown in FIG. 1.

Referring to FIG. 1, sacrificial anodes have been used extensively in the past in environments where corrosion protection is necessary. An example of such an environment is a hot water tank 10 having a metal wall 12. A conventional sacrificial anode 14, also shown in FIG. 2, is provided in order to protect the metal wall 12 from corrosion. Referring now to FIG. 2, the conventional sacrificial anode 14 includes an extruded metal rod 18 of magnesium, aluminum or zinc having a diameter in the area of ½ inch – 1 inch and with an inner steel core wire 16. The outer anode sleeve 18 is preferably formed of magnesium, although aluminum or zinc may be substituted for the magnesium anode. The anode 14 is inserted lengthwise into the tank 10 to prevent corrosion of the tank.

As explained previously, tests have shown that the upper and lower portions of the anode 14 are expended more rapidly than the central portion. The effect of this nonlinear corrosion either requires premature replacement of the anode rod 14 or, if the rod is not replaced, results in excessive corrosion of the tank 10, decreasing its effective life.

The anode of the present invention 20 is formed of extruded anode sections 22, 24 and 26. These sections 22, 24, 26 have varying shapes and are designed specifically to provide a greater amount of effective anode mass in portions of the tank 10 that require a greater amount of corrosion protection, namely, the top and bottom of the tank 10.

Figure 3:
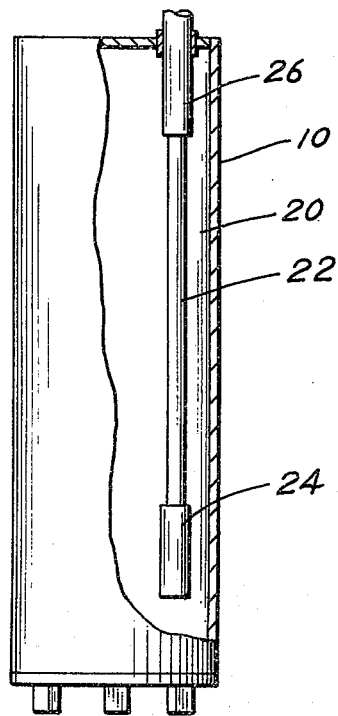
FIG. 3 is a side elevational view of a container partially broken away and of the shaped sacrificial anode of the present invention.
Figure 4:
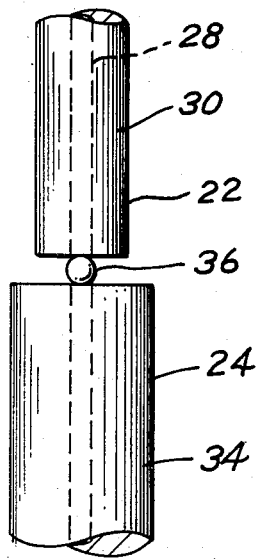
FIG. 4 is a side perspective view of the formation of the shaped sacrificial anode of the present invention.
Figure 5:
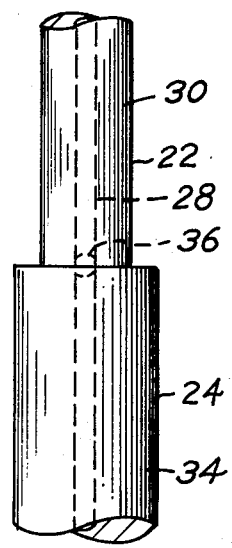
FIG. 5 is a side perspective view of two shaped, extruded anode sections joined together in accordance with this invention.

In the particular example shown in FIGS. 3–5, the first anode section 22 is an extruded anode rod 30 having an inner metal core wire of steel 28. The second extruded anode section 24 is similarly formed, with a core wire 32 and rod 34. However, the second section 24 has a greater diameter than the first section 22, thus increasing the effective mass or mass per unit length of the second anode section 24 relative to the first anode section 22.

Likewise, the third anode section 26 has a greater diameter than the first anode section 22 and thus has a greater effective mass than the first anode section 22. In this manner, a given anode 20, shaped appropriately with additional anode mass at the top and bottom of the tank 10, will effectively and economically extend the expected lifetime of the tank 10, protect the tank 10 from corrosion, and minimize the number of replacements of the anode 20 during the life of the tank 10.

The anode sections are joined by a unique process. For example, the second anode section 24 and first anode section 22 may be resistance-welded together by placing a steel sphere 36 between the steel core wire 28 of the first anode section 22 and the steel core wire 32 of the second anode section 24. The two anode sections 22 and 24 and more particularly, the wires 28 and 32 are then welded, for example, by resistance-welding. Thus a low-voltage, high-current electrical power source is applied to the ends of the core wires 28 and 32 of the anode sections 22 and 24. Other welding techniques may be used to join the extruded anode sections 22 and 24, but resistance-welding is a preferred technique.

After the welding step is complete, sections 22 and 24 are joined as shown in FIG. 5. The second anode section 24 is of course selected, as indicated earlier, to have a greater effective mass than the mass of the first anode section 22.

In like manner, the third anode section 26 may be connected to the first anode section 22. Utilizing this method, an extruded anode rod may be constructed in any length desired. Various anode sections of desired shape and size may be employed to provide a sacrificial anode having a maximum effective mass adjacent at any point or region desired. In the present invention, an extruded anode rod is preferred since extruded anodes have proven to be more satisfactory than cast anodes.

In the particular environment of a cylindrically shaped hot water tank, which generally has a height substantially greater than its diameter, it is desirable to provide a shaped, extruded anode from sections which form an anode having a shape similar to that of an hourglass. In other words, the anode will have a greater effective mass at the top and at the bottom of the tank relative to the mass at the center portion of the anode.

While in the foregoing there has been described a preferred embodiment of the anode and method of constructing the same of the present invention, it should be understood that other embodiments may be made of this invention without departing from the true spirit and scope thereof.

What is claimed is:

1. An improved method for manufacture of an anode of the type having a variable mass per unit length of anode material comprising the steps of:
   a. providing a first anode section comprising an exposed center core wire and a surrounding jacket of anode material;
   b. providing a second anode section comprising an exposed center core wire and a surrounding jacket of anode material, said first anode section having a mass per unit length distinct from the mass per unit length of said second anode section;
   c. contacting at least the exposed center core wires of the separate anode sections; and
   d. welding the contacted core wires to provide a unitary continuous core wire and an anode member comprised of a plurality of anode sections.

2. The improved method of claim 1 including the step of welding additional anode sections by means of welding the center core wire thereof.

3. The improved method of claim 1 wherein said welding step comprises the process of resistance welding the contacted core wires.

4. The improved method of claim 1 wherein said welding step includes the additional step of inserting core wire material between the ends of contacted center core wires and subsequently resistance welding the core wires and core wire material to form a single core wire.

5. An improved method for providing cathodic protection for the inner walls of a metal container filled at least in part by an electrically conductive fluid, said container including portions thereof requiring relatively greater cathodic protection than other portions thereof, said method comprising the steps of:
   a. providing a first anode section comprising a center core wire and a surrounding jacket of sacrificial anode material;
   b. providing a second anode section comprising a center core wire and a surrounding jacket of sacrificial anode material, said first anode section having a mass per unit length distinct from the mass per unit length of the second anode section;
   c. contacting at least the center core wire of the first anode section with the center core wire of the second anode section;
   d. welding the contacted core wires to provide a unitary continuous anode member comprising a plurality of anode sections; and
   e. positioning the formed anode in the container with the anode section having the greater mass per unit length in the portion of the container requiring the relatively greater cathodic protection.

* * * * *